No. 748,953. PATENTED JAN. 5, 1904.
W. S. JACOBS.
TOOL FOR SEATING RUBBER TIRES IN RIM CHANNELS.
APPLICATION FILED DEC. 29, 1902.
NO MODEL.
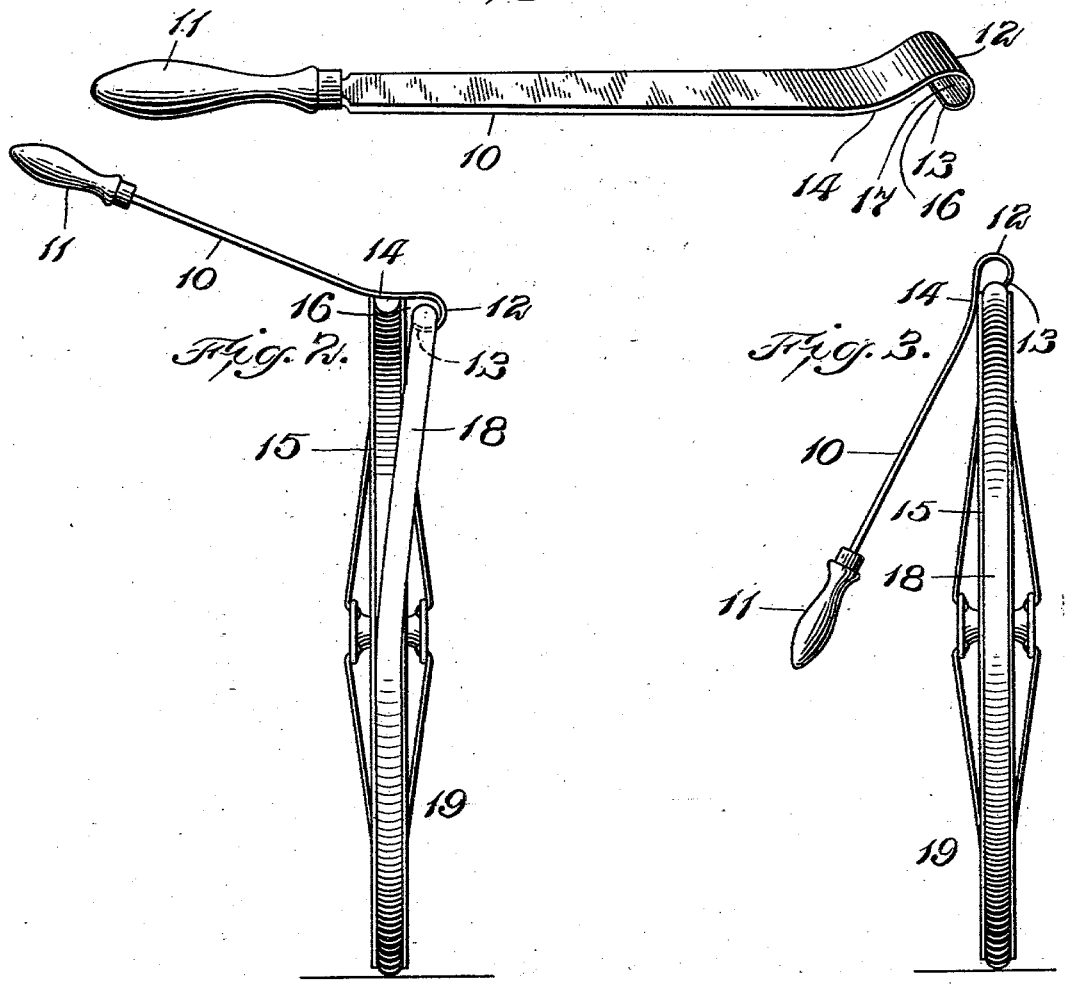
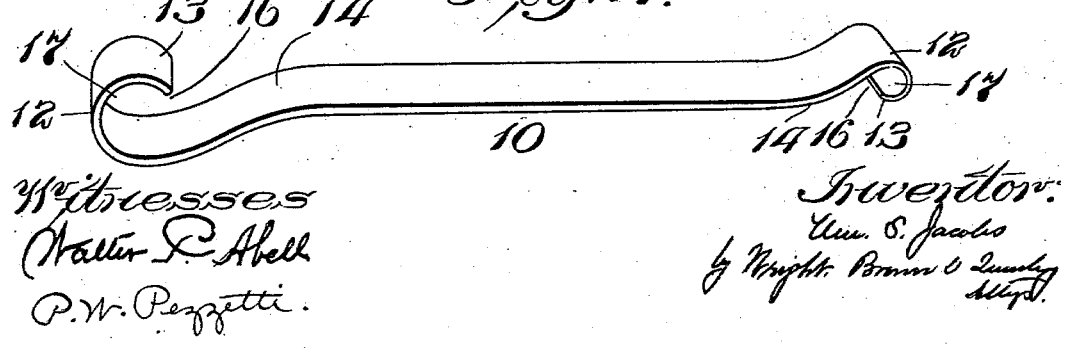

No. 748,953. Patented January 5, 1904.

UNITED STATES PATENT OFFICE.

WILLIAM S. JACOBS, OF MALDEN, MASSACHUSETTS.

TOOL FOR SEATING RUBBER TIRES IN RIM-CHANNELS.

SPECIFICATION forming part of Letters Patent No. 748,953, dated January 5, 1904.

Application filed December 29, 1902. Serial No. 136,930. (No model.)

*To all whom it may concern:*

Be it known that I, WILLIAM S. JACOBS, of Malden, in the county of Middlesex and State of Massachusetts, have invented certain new and useful Improvements in Tools for Seating Rubber Tires in Rim-Channels, of which the following is a specification.

This invention relates to a tool for seating rubber tires in the grooves or channels of wheel-fellies; and its object is to provide such a tool of strong and inexpensive construction with which the operation can be quickly and easily performed.

Of the accompanying drawings, Figure 1 represents a perspective view of a tire-seating tool constructed in accordance with my invention. Fig. 2 represents an elevation showing the tool applied to a wheel and tire, this view representing the first part of the operation of seating the tire. Fig. 3 represents an elevation showing the position of the parts at the end of the operation. Fig. 4 represents a side elevation showing a double-ended tool.

The same reference characters indicate the same parts in all the figures.

In the drawings Figs. 1, 2, and 3, 10 represents the tool-shank, having a handle 11 at one end and a hook-shaped head 12 at the other end, said head being bent or recurved, so that its end 13 faces back in the direction of or substantially parallel to the shank 10. The head is bent or curved back from the shank, so as to leave a projecting fulcrum portion or breast 14, which is adapted to reside against the edge of the wheel-rim or felly 15 when the tool is in use, as represented in Figs. 2 and 3. Between the lip or edge 13 and the fulcrum portion 14 is a space or throat 16 of sufficient width only to easily admit a tire which would nearly fill the main recess 17 of the hook.

The manner of using the tool is as follows: The tire 18 to be applied to the wheel 19 is first placed in the channel or groove of the rim 15 as far around as it will go without stretching, and then the remaining or unseated portion is engaged with the hook-shaped head 12 of the tool, and the fulcrum portion 14 of said tool is caused to reside against the edge of the rim, as shown in Fig. 2. Then by downward movement of the handle of the tool the said tool is used as a lever and its hooked head caused to rise in an arc until the head is substantially over the tire-channel, as shown in Fig. 3. This takes place just before the shank 10 has reached a perpendicular position parallel to the frame of the wheel 19 because the shank 10 and the back or closed side of the head are located substantially at one side of a line extending through the fulcrum portion and the central portion of the recess of the head, while the throat 16 is at the opposite side of said line. The result of this arrangement is that when the tire slips out of engagement with the hooked head 12 its elasticity causes it to spring into the rim-channel. If a comparatively large portion of the length of the tire is unseated in the rim, it may be necessary to perform two or more operations with the tool along the unseated portion of the tire before the latter is fully in place.

I claim—

A tool for seating rubber tires, comprising a fulcrum portion or breast, a hook-shaped head located at one side of said fulcrum portion and bent or recurved to such an extent that its end faces back in the direction of the fulcrum portion and is separated from the latter only by a space or throat substantially sufficient to admit a tire which can be accommodated in the recess of the hook, and a shank or handle portion located at the opposite side of the fulcrum portion and extended therefrom, the said shank and the back or closed side of the head being substantially at one side of a line extending through the fulcrum portion and the central portion of the recess of the head, while the throat of the head is located at the opposite side of said line, whereby when the shank is swung inwardly toward the side of a wheel the said throat is brought into coincidence with the tire-receiving groove of the wheel.

In testimony whereof I have affixed my signature in presence of two witnesses.

WILLIAM S. JACOBS.

Witnesses:
R. M. PIERSON,
WM. E. WATERMAN.